United States Patent
Duerr et al.

(10) Patent No.: US 7,463,271 B2
(45) Date of Patent: Dec. 9, 2008

(54) OPTIMIZED ACCESS FOR DRAWING OPERATIONS

(75) Inventors: Herbert Duerr, Ahrensburg (DE); Thomas Hosemann, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 1259 days.

(21) Appl. No.: 10/116,681

(22) Filed: Apr. 4, 2002

(65) Prior Publication Data

US 2002/0180757 A1 Dec. 5, 2002

(51) Int. Cl.
G06T 11/60 (2006.01)
(52) U.S. Cl. ........................ 345/620; 345/629
(58) Field of Classification Search ........ 345/620, 345/629
See application file for complete search history.

(56) References Cited

U.S. PATENT DOCUMENTS

| | | | | |
|---|---|---|---|---|
| 5,434,968 A * | 7/1995 | Kunii et al. | ........ | 345/505 |
| 5,491,780 A | 2/1996 | Fyles et al. | | |
| 5,559,950 A | 9/1996 | Cannon | | |
| 5,819,278 A * | 10/1998 | Hamburg | ........ | 345/620 |
| 6,348,919 B1 * | 2/2002 | Murphy | ........ | 345/629 |

FOREIGN PATENT DOCUMENTS

GB 2330287 4/1999

OTHER PUBLICATIONS

Tosiyasu L. Kunii et al., Parallel Polygon Rendering on the Graphics Computer VC-1, 1995, IEEE, pp. 2-9.*
Jason Park et al., An Object-Based Parallel Rendering System, 2000, IEEE, pp. 766-771.*
Borvis Rabinovich et al., Visualization of Large Terrains in Resource-Limited Computing Environments, 1997, IEEE, pp. 95-102.*
Rudrajit Samanta et al., Load Balancing for Multi-Projector Rendering Systems, 1999, Princeton University, pp. 1-11.*
Michael Potmesil, "Maps alive: viewing geospatial information on the WWW," *Computer Networks and ISDN Systems*, 29 (1997), pp. 1327-1342.

* cited by examiner

Primary Examiner—Jeffery A. Brier
(74) Attorney, Agent, or Firm—Sonnenschein Nath & Rosenthal LLP

(57) ABSTRACT

Methods, systems, and articles of manufacture consistent with the present invention improve drawing operations for drawing an object that has object information onto a background image, which has background image information, already displayed on a display device. A sub-region of the object including at least one pixel intersected by a boundary of the object is determined, where the sub-region corresponds to a portion of the background image information. It is determined whether the portion of the background image information corresponding to the sub-region is stored locally with respect to a program or remotely with respect to the program. When it is determined that the portion of the background image information is stored locally, the portion of the background image information is retrieved locally to facilitate generating a redrawn sub-region of the object.

46 Claims, 12 Drawing Sheets

OPTIMIZED ACCESS FOR DRAWING OPERATIONS

CROSS-REFERENCE TO RELATED APPLICATIONS

This Application claims priority to the filing date of the following foreign patent application, which is incorporated herein by reference:

European Patent Application No. 01107782.3, entitled "OPTIMIZED ACCESS FOR DRAWING OPERATIONS" filed Apr. 4, 2001.

FIELD OF THE INVENTION

The present invention relates to computer graphics, and in particular, the invention relates to drawing an object on a client video display.

BACKGROUND OF THE INVENTION

Computers provide services to users in a growing number of fields, including personal programs and office programs. Such programs can include text processing programs, image processing programs, spread sheet programs, personal data services, e-mail programs, and home banking programs.

With the availability of video displays of increasing quality for data processing systems, graphics and display contents have increased in detail. A video display screen image presented to a user when executing a program, may be partitioned into a number of individual fields, where each field is suitable for displaying various graphic elements, numbers, signs, and letters.

For example, in a text editing program or an Internet program, it can be required to display text elements in a variety of different fonts on a video display, and it should be possible to arbitrarily scale the various text elements. This also applies when displaying other objects on a video display. The representation of an object on a video display may have high quality, irrespective of a size or position of the object.

Typically, a video display screen of a data processing system is divided into a large number of pixels, where each pixel represents a point, square, or rectangle on the video display screen with a defined size. Each pixel may be individually driven to display image information, e.g., color hue and saturation. Color hue refers to an object's gradation of color, such as red, blue, or green. Saturation refers to the color's chromatic purity, that is its freedom from dilution with the color white. A plurality of pixels that are viewed together from a certain distance may then generate a visual representation of an object on the video display.

If it is assumed that a letter is to be displayed in black onto a white background, an individual pixel on the video display will either be colored black or white, depending on the position of the letter. This may work as desired if the boundary of the letter or object lies on the border line between two pixels, because in this case, the transition from black to white represents the object boundary, leading to a clear display of the object. However, an exact representation of the object on the screen is not possible if the object boundary does not lie on the border line between two pixels, for example, if the border of the object obliquely cuts through a number of pixels. In this case, the video display driver will represent the entire pixel in black or in white, even though a part of the pixel should be displayed in white and another part of the pixel should be displayed black.

As a result, the object representation on the video display does not correctly reflect the original object, i.e., the object boundaries become jagged or frayed instead of smooth. For example, if an oblique line, for example of the letter "A", is to be displayed on a screen, the oblique part of the "A" will appear on the display as having step-like boundaries, which may impair recognition of the displayed character.

Even though high resolution displays having a large number of pixels are available, for example allowing a resolution of 1024 by 800 pixels, if small objects are to be displayed, an object representation on the display may become distorted when the object size or the size of a detail of the object lies within the range of the size of a pixel.

Thus, if for example a text document with small fonts is to be displayed on a screen, the contours of the individual letters may become distorted when the size of the letters account for a relatively small number of pixels. The letters may become further distorted when the letters are displayed over a complex background image.

In this case, in order to improve the appearance of the displayed object, pixels at the boundary of the object could be calculated according to an algorithm, such as an antialiasing algorithm, to include both object and background information. The thus computed pixels should reduce the distortion of the object boundaries to a viewer. In this case, however, a drawing program is typically used that resides on a single data processing device as a single program or module. The drawing program is responsible for drawing the object and providing the background for the object, i.e., a background color or image, onto which the object is drawn.

In a growing number of fields, however, programs do not reside as a single module on a single data processing device. To the contrary, an increasing number of programs are distributed programs executed on a plurality of data processing devices. Also, programs executed on a single data processing device can be partitioned into a plurality of modules. In this case, a module responsible for performing a drawing operation for an object may not be aware of background information underneath the object, and therefore providing a smooth transition between object and background is typically not possible. Also, in typical programs, those modules handling background information of a display screen are physically separate from modules providing drawing operations of objects. These modules may either be at different locations in a single data processing device, or, they may reside on different data processing devices, communicating via a data link, such as a computer network.

For example, consider a case of a data processing system that has an application server with a module for performing drawing operations and a client device with a video display, where an object is to be displayed. When the application server needs to perform an antialiasing operation for the object and the background on which the object is to be displayed, the application server typically first requests the display screen background information from the client. The client retrieves the background information from, for example, the client video display frame buffer and transmits the background information to the application server. Then, the application server performs the antialiasing operation. When the antialiasing operation is completed, the application server transmits the antialiased image of the object merged with the retrieved background information back to the client for output to the display screen. Therefore, three communications take place between the application server and the client to display the object on the client video display. This results in costly communication between the application server and the client device each time an object is to be displayed.

Based on the above-described problems of drawing operations, it is therefore desirable to improve graphics drawing systems.

SUMMARY OF THE INVENTION

Methods, systems, and articles of manufacture consistent with the present invention provide efficient drawing operations for drawing an object onto a background image that is displayed on a display device. When an object to be displayed will overlap a background image on the display device screen, it is possible that the object will be distorted due to the background image presented "behind" the object. For example, when the boundary lines of the object are skewed to the lines of the underlying background image, the object might appear distorted. To reduce this distortion, a drawing program performs an antialiasing operation using the object and the background image. Before performing the antialiasing operation, however, the drawing program determines whether the information for the portion of the background image that will be overlapped by the object is stored locally in a locally managed cache (e.g., a data structure), as opposed to in a frame buffer of the display device, which is remote with respect to the drawing program. If the information for the background image is stored in the cache, then that information is used to perform the antialiasing operation. Otherwise, the drawing program requests a display program to retrieve the background image information from the frame buffer. In a client-server based system, the drawing program is stored on a client device and the display program is stored on a client device, which is connected to the server device via a network. Accordingly, unlike a typical graphics drawing system, the background image information does not have to be retrieved each time an antialiasing operation is performed, which reduces costly communication between the drawing program and the display program.

For example, in a client-sever based system, a drawing program on a server has a local cache where it stores information describing a background image of a video display screen that is located on a client. In the local cache, the drawing program has information that the background image contains two items: an empty field of blue pixels that is stored in the local cache and a display object that looks like an apple, which is stored on the client in the frame buffer. When the drawing program is to display an object such as a red letter "A" on the background image in order to perform an antialiasing operation, the drawing program retrieves the background image from the local cache when the letter "A" is to be displayed on the empty field of blue pixels, and requests retrieval of the background image from the frame buffer on the client when the letter "A" is to be displayed on the display object that looks like an apple. Thus, communication bandwidth and time can be conserved when the letter "A" is to be displayed on the empty field of blue pixels.

In accordance with methods consistent with the present invention, a method performed by a program in a data processing system for outputting an object having object image information to a display device that includes a plurality of pixels with background image information is provided. The method comprises the steps performed by the program of: determining a sub-region of the object including at least one pixel intersected by a boundary of the object, the sub-region corresponding to a portion of the background image information; determining whether the portion of the background image information corresponding to the sub-region is stored locally with respect to the program or remotely with respect to the program; and when it is determined that the portion of the background image information is stored locally, retrieving the portion of the background image information locally to facilitate generating a redrawn sub-region of the object.

In accordance with methods consistent with the present invention, a method performed by a program in a data processing system for outputting an object having object image information to a display device that includes a plurality of pixels with background image information is provided. The method comprises the steps performed by the program of: determining a sub-region of the object including at least one pixel intersected by a boundary of the object; determining whether a portion of the background image information corresponding to the subregion of the object is stored locally with respect to the program in a cache or remotely with respect to the program in a frame buffer; when it is determined that the portion of the background image information is stored locally, retrieving the portion of the background image information corresponding to the sub-region of the object from the cache; when it is determined that the portion of the background information is stored remotely, retrieving the portion of the background image information corresponding to the sub-region of the object from the frame buffer by transmitting a sub-region of the object request from the program to a display program for requesting the portion of the background image information corresponding to the sub-region of the object from the frame buffer, and receiving from the display program the requested portion of the background image information; and generating a redrawn sub-region of the object for output by merging the object image information with the retrieved portion of the background image information.

In accordance with articles of manufacture consistent with the present invention, a computer-readable medium containing instructions that cause a program in a data processing system to perform a method is provided. The data processing system is for outputting an object having object image information to a display device that includes a plurality of pixels with background image information. The method comprises the steps performed by the program of: determining a sub-region of the object including at least one pixel intersected by a boundary of the object, the sub-region corresponding to a portion of the background image information; determining whether the portion of the background image information corresponding to the sub-region is stored locally with respect to the program or remotely with respect to the program; and when it is determined that the portion of the background image information is stored locally, retrieving the portion of the background image information locally to facilitate generating a redrawn sub-region of the object.

In accordance with articles of manufacture consistent with the present invention, a computer-readable medium containing instructions that cause a program in a data processing system to perform a method is provided. The data processing system is for outputting an object having object image information to a display device that includes a plurality of pixels with background image information. The method comprises the steps performed by the program of: determining a sub-region of the object including at least one pixel intersected by a boundary of the object; determining whether a portion of the background image information corresponding to the sub-region of the object is stored locally with respect to the program in a cache or remotely with respect to the program in a frame buffer; when it is determined that the portion of the background image information is stored locally, retrieving the portion of the background image information corresponding to the sub-region of the object from the cache; when it is determined that the portion of the background information is stored remotely, retrieving the portion of the background image information corresponding to the sub-region of the object from the frame buffer by transmitting a sub-region of the object request from the program to a display program for requesting the portion of the background image information corresponding to the sub-region of the object from the frame buffer, and receiving from the display program the requested portion of the background image information; and generating a redrawn sub-region of the object for output by merging the object image information with the retrieved portion of the background image information.

In accordance with systems consistent with the present invention, a data processing system is provided. The data processing system comprises: a display device having a plurality of pixels with background image information, the display device for displaying an object having object image information; a memory comprising a computer program that determines a sub-region of the object including at least one pixel intersected by a boundary of the object, the sub-region corresponding to a portion of the background image information, determines whether the portion of the background image information corresponding to the sub-region is stored locally with respect to the computer program or remotely with respect to the computer program, and, when it is determined that the portion of the background image information is stored locally, retrieves the portion of the background image information locally to facilitate generating a redrawn sub-region of the object; and a processing unit that runs the computer program.

In accordance with systems consistent with the present invention, a data processing system for outputting an object having object image information to a display device that includes a plurality of pixels with background image information is provided. The data processing system comprises: means for determining a sub-region of the object including at least one pixel intersected by a boundary of the object, the sub-region corresponding to a portion of the background image information; means for determining whether the portion of the background image information corresponding to the sub-region is stored locally with respect to the program or remotely with respect to the program; and means for retrieving the portion of the background image information locally to facilitate generating a redrawn sub-region of the object, when it is determined that the portion of the background image information is stored locally.

In accordance with articles of manufacture consistent with the present invention, a computer-readable memory device encoded with a program with a locally accessible data structure is provided. The program is run by a processor in a data processing system. The data structure has a plurality of entries, each entry comprising: a background image information for a portion of a background image displayed on a display device, wherein when the program attempts to display an object that covers the portion of the background image on the display device, the program accesses the entry.

The above-mentioned and other features, utilities, and advantages of the invention will become apparent from the following detailed description of the preferred embodiments of the invention together with the accompanying drawings.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Figure 1:
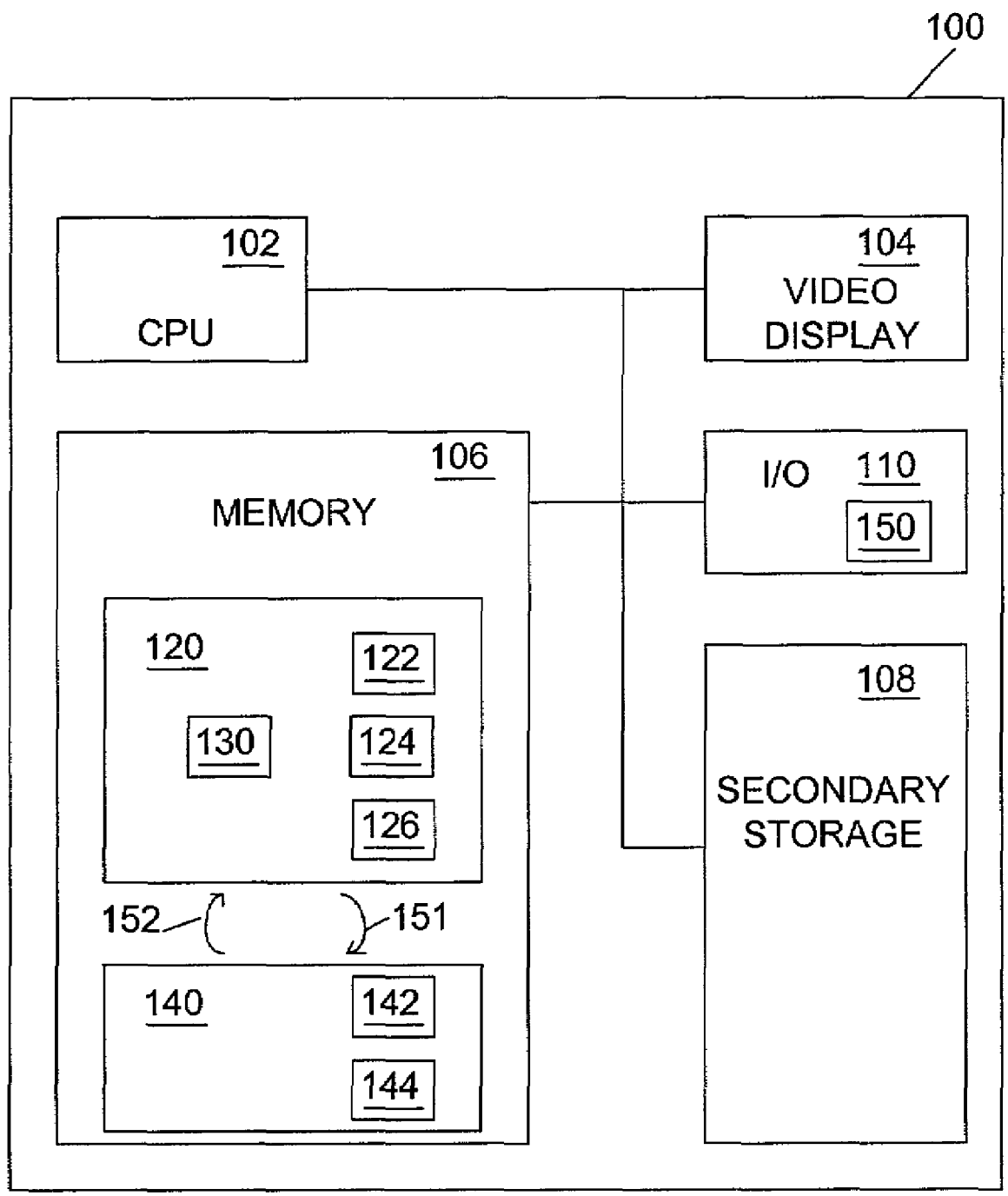
FIG. 1 depicts a block diagram of a data processing system suitable for use with methods and systems consistent with the present invention.

Reference will now be made in detail to an implementation consistent with the present invention as illustrated in the accompanying drawings. Wherever possible, the same reference numbers will be used throughout the drawings and the following description to refer to the same or like parts.

In accordance with methods, systems, and articles of manufacture consistent with the present invention, drawing operations are optimized for drawing an object onto a background image that is displayed on a display device. Before performing an antialiasing operation to merge the object with the background image for display, a drawing program determines whether the information for the portion of the background image that will be overlapped by the object is stored locally in a locally managed cache (e.g., a data structure), as opposed to in a frame buffer of the display device, which is remotely located with respect to the drawing program. If the information for the background image is stored in the cache, then the locally stored background information is used to perform the antialiasing operation. Otherwise, the drawing program requests a display program to retrieve the background image information from a frame buffer. The drawing program and the display program can be located on the same data processing device or on separate data processing devices, such as in a client-server based data processing system where a server has the drawing program and the cache and a client has the display program and the frame buffer. By using the cache, the methods and systems can improve performance, by avoiding the need to use background information from the frame buffer, which takes longer, particularly when the frame buffer is stored on a remote computer.

For example, a drawing program has a local cache, which contains information relating to a background image. The information identifies that the background image contains two items: an empty field of blue pixels that is stored in the local cache and a display object that looks like an apple, which is stored in the frame buffer. When the drawing program is to display an object such as a letter "A" on the background image, in order to perform an antialiasing operation, the drawing program retrieves the background image from the local cache when the red letter "A" is to be displayed on the empty field of blue pixels, and requests retrieval of the background image from the frame buffer when the red letter "A" is to be displayed on the apple.

Accordingly, communication bandwidth and time are conserved compared to typical graphics display systems when the background image information is stored and retrieved from the local cache.

FIG. 1 depicts a data processing system 100 suitable for use with methods and systems consistent with the present invention. Data processing system 100 comprises a central processing unit (CPU) 102, an input output I/O unit 104, a memory 106, a secondary storage device 108, and video display 110. The data processing system may further comprise standard input devices such as a keyboard, a mouse or a speech processing means (each not illustrated).

Video display 110 may comprise any suitable output device, e.g., a video display partitioned into a plurality of pixels. Further, the video display may comprise, for example, a cathode ray tube, a TFT display, a projecting display, a printer, or another output device. Alternatively, the video display may be a virtual device for temporarily storing an output content, such as screen contents, for later output onto a display screen or to a printer. The pixels may be represented by points, rectangles, or squares of a predetermined size. Thus, a plurality of pixels can be used to represent grayscale, color information, saturation, and hue of an object. Grayscale, color information, saturation, and hue are terms known to one of skill in the art and will not be described in more detail herein. The number of pixels available determines the maximum resolution of a the video display, however, a resolution of the video display may also be determined by an program executed at the data processing system and driving the video display, as is known to one of skill in the art.

Video display 110 comprises a frame buffer 150, which is a memory that holds the pixels from which the video display (frame) is refreshed. The term frame, as used herein, refers to all of the pixels of the display. One having skill in the art can appreciate that the frame buffer can alternatively be on a video card in the data processing system.

Memory 106 contains a drawing program 120. Drawing program 120 comprises a determining component 122, a drawing program communication component 124, and a drawing component 126. Determining component 122 is for determining an object sub-region, which includes at least one pixel that is intersected by boundary of the object image. Drawing program communication component 124 is for obtaining, from a display program 140, background image information for the pixels on the client video display that correspond to where the object sub-region is to be displayed, and for sending a redrawn object sub-region to the display program 140 for display on the video display 110. Drawing component 126 is for creating the redrawn object sub-region by superimposing the object image onto the portion of the background image that corresponds to the object sub-region and performing an antialiasing operation on the redrawn sub-region. Drawing program 120 the functionality associated with its components will be described in more detail below.

The program components described herein may comprise or may be included in one or more code sections containing instructions for performing their respective operations. While the drawing program is described as being implemented as software, the present implementation may be implemented as a combination of hardware and software or hardware alone. Also, one of skill in the art will appreciate that the drawing program may comprise or may be included in a data processing device, which may be a server, communicating with the data processing system.

As will be described in more detail below, the drawing program includes a data structure 130 having an entry reflecting background image information describing an item of a background image displayed on the display device, wherein the program replaces the background image information with the background image information merged with an object image information when the item has a single color and replaces the background image information with a different background image information merged with the object image information when the item does not have a single color. In the illustrative data structure shown in FIG. 2, the data structure contains a root object information 202, an object1 information 204, an object2 information 206, and an object3 information 208. As will be described in more detail below, the contents of the data structure will reflect the items making up the background image that the drawing program knows about.

Memory 106 also contains a display program 140, which comprises a display program communication component 142 and a retrieval component 144. Display program communication component 142 receives object sub-region requests from the drawing program, which requests background image information for the pixels of the background image that correspond to the object sub-region. The background request is transmitted from the drawing program to the display program, as illustrated by an arrow 151 in FIG. 1. Retrieval component 144 retrieves the background image information of the pixels that correspond to the object sub-region from, for example, the frame buffer for the video display. Display program communication component 142 transmits the retrieved background image information to the drawing program, as illustrated by an arrow 152 in FIG. 1.

Display program 140 can be any suitable program that can drive the video display device and execute graphics commands, such as a graphics server. The display program can be, for example, the X Window System™ display server (XServer) or the Microsoft® Windows™ API. As will be described in more detail below, information, such as the background image information that corresponds to the object sub-region, is retrieved from the display program by, for example, a "call" command. And the redrawn object sub-region can be sent from the drawing program to the display program by, for example, a "put" command. These commands are illustrative examples of the types of commands that can be used for implementing communication between the drawing program and the display program, however, methods and systems consistent with the present invention is not limited to these commands. One of skill in the art will appreciate that the commands used for implementing this communication will depend on the display program used. X Window System is a trademark of X Consortium, Inc. Microsoft and Windows are trademarks or registered trademarks of Microsoft Corporation. All other company and product names may be trademarks of their respective companies.

Figure 3:
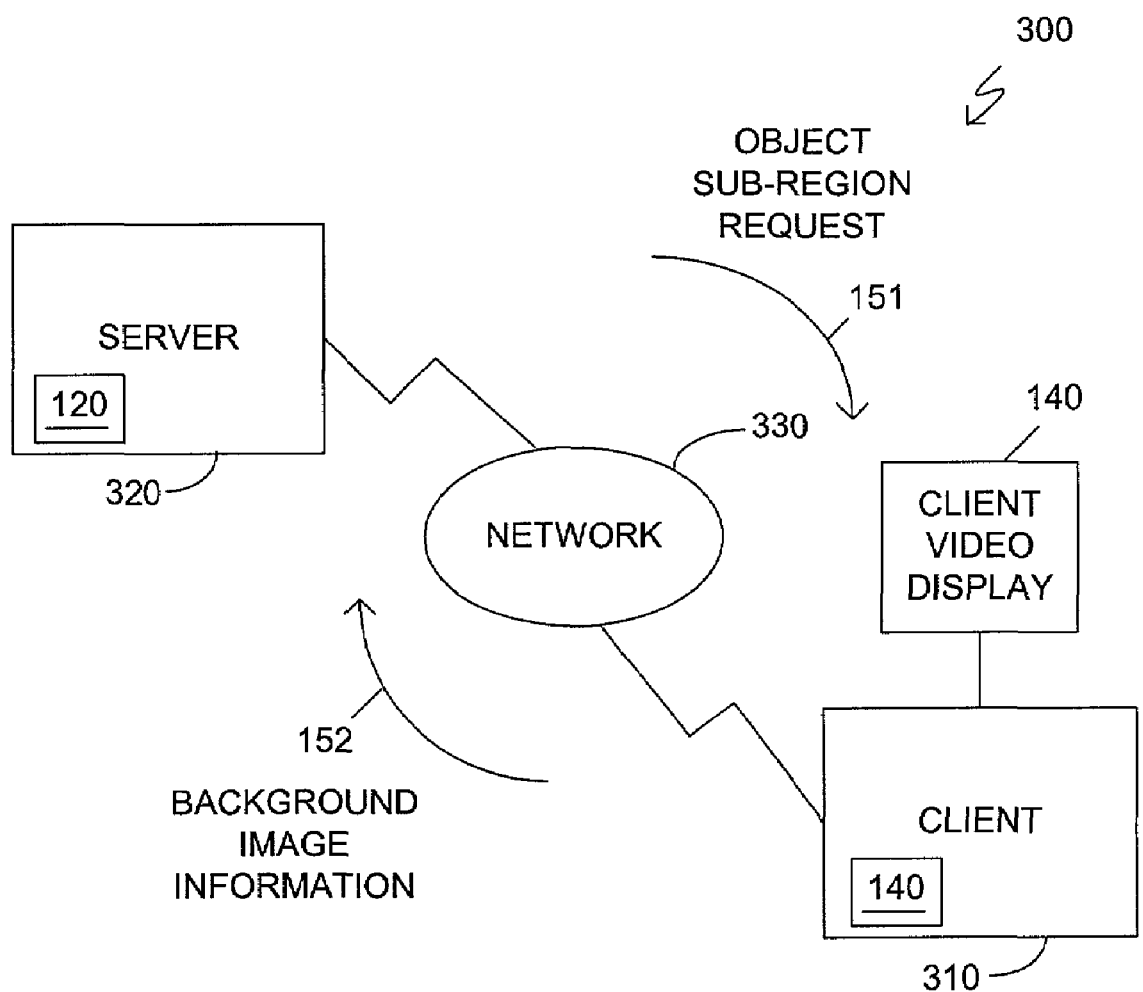
FIG. 3 depicts a block diagram of a client-server computer system suitable for use with methods and systems consistent with the present invention.

One having skill in the art will appreciate that methods and systems consistent with the present invention may also be implemented in a client-server environment, like the one depicted in FIG. 3. FIG. 3 depicts a block diagram of a client-server based data processing system 300 in which methods, systems, and articles of manufacture consistent with the present invention may be implemented. A client computer system 310 and a server computer system 320 are each connected to a network 330, such as a Local Area Network, Wide Area Network, or the Internet. The display program can be on client computer system 310 for displaying an image on a client video display 140, while some or all of the processing as described below with reference to the drawing program is carried out on server computer system 320, which is accessed by the client computer system 310 over the network 330.

Although aspects of methods and systems consistent with the present invention are described as being stored in memory, one having skill in the art will appreciate that all or part of methods and systems consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of the client computer system and the graphics server have been described, one skilled in the art will appreciate that a data processing system suitable for use with methods, systems, and articles of manufacture consistent with the present invention may contain additional or different components.

Figure 4:
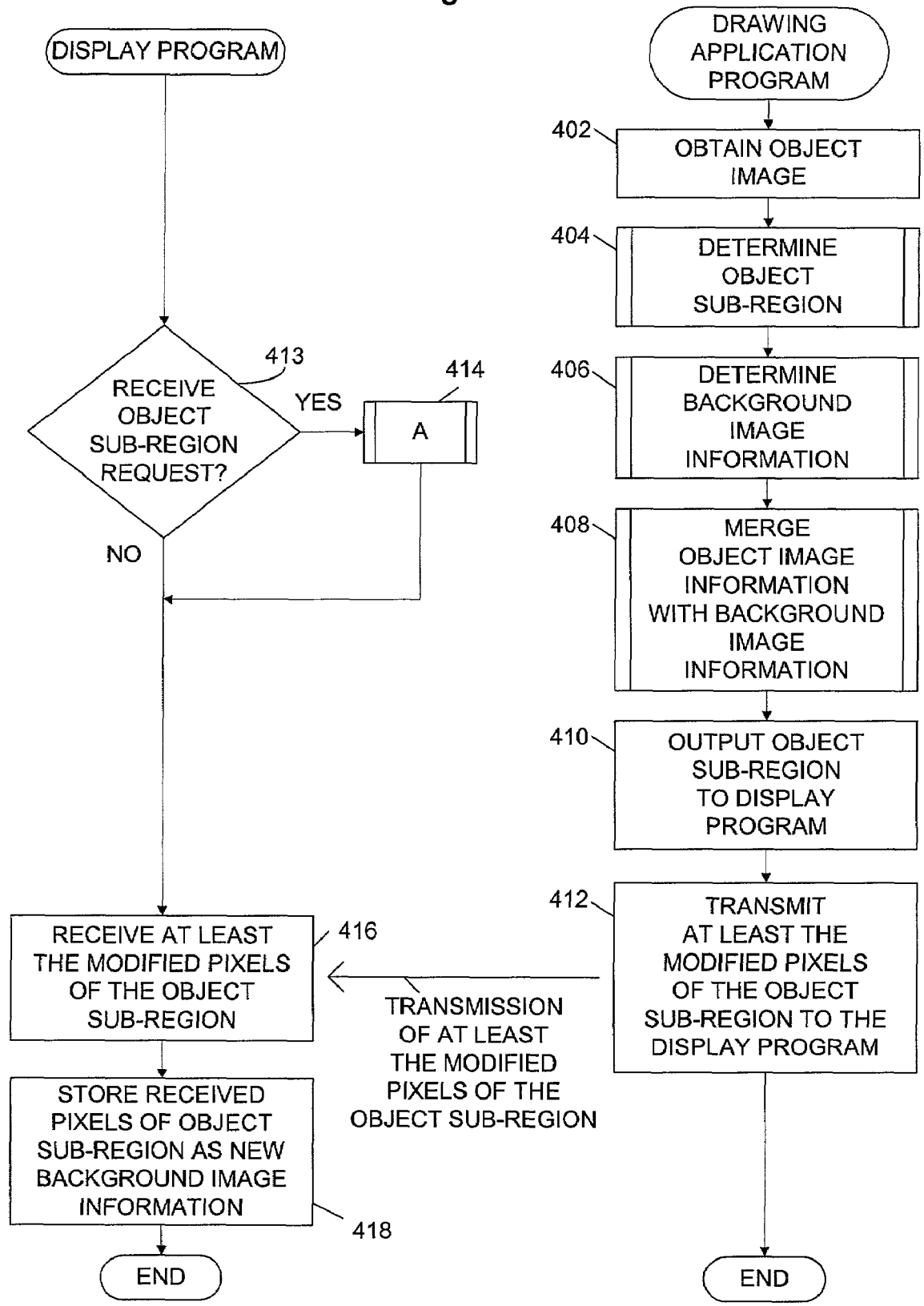
FIG. 4 depicts a flow diagram illustrating the steps for outputting an object to a display device in accordance with methods and systems consistent with the present invention.

FIG. 4 depicts a flow diagram illustrating exemplary steps for drawing a representation of an object on the video display (i.e., on the video display screen). In particular, FIG. 4 depicts steps carried out on a data processing system, such as data processing system 100 shown in FIG. 1, however FIG. 4 is not limited thereto.

First, the drawing program obtains an object to be output on the video display (step 402). Obtaining the object may comprise a known sequence of operations for receiving the object from another device or generating the object to be displayed with the drawing program. For example, if the text "PEANUTS" is to be displayed on the video display, the drawing program obtains the corresponding object by retrieving a corresponding font from the secondary storage and scaling the font as appropriate using well known techniques. The font and the scaling factor can be, for example, received as input from a user or predetermined values.

The drawing program represents the object by a collection of coordinate boundary points and further information regarding, for example, pixel colors the object, or by vectors for facilitating scalability. The object may have any shape, color, or saturation, as required and as supported by the video display.

The object may have any shape, such as a line, solid parts, or patched parts. For example, the object may comprise a letter, a number, a character, or a geometrical shape.

If the video display is a black and white display, the drawing program can represent a pixel corresponding to the object by grayscale information, while in the case of color displays, the drawing program can represent the pixel by additional information regarding color and saturation.

Then, the drawing program determines an object sub-region including at least one pixel intersected by a boundary of the object (step 404). The object sub-region is the portion of the object image that will be displayed on the video display. For example, in the above-described example where the text "PEANUTS" is to be displayed, the letters "PEA" of the text may fall outside of the viewing area of the display screen or may be clipped due to the size of a window in which the text will be displayed. Thus, the object sub-region will contain the portion of the text that will be displayed (i.e., "NUTS"), but not the portion of the text that will not be displayed (i.e., "PEA").

The object sub-region may have any suitable shape and describes an area on the video display, i.e., a collection of pixels of the client video display that are determined to be at least partially covered by the object to be drawn to the video display. For example, the object sub-region can have the shape of the object, a rectangular shape, triangular shape, or octagonal shape.

The object sub-region may thus be a region including all pixels which are at least partially covered by the object, and may have the shape of the object itself, or may be constituted by another shape including pixels at least partially covered by the object. For example, since the video display can comprise rows and columns of pixels, an object sub-region may be defined as a rectangle including pixels at least partially covered by the object. In this case, the object sub-region may be defined by specifying the corner pixels of the rectangle, thus providing a concise description of the object sub-region. If the object sub-region is defined by the shape of the object, considerable information, such as coordinates of pixels, may be needed to describe the object sub-region.

As the object may include a plurality of sub-objects, such as a collection of characters or geometrical shapes, the object sub-region can also be defined as a region covering the collection of sub-objects.

Figure 5:
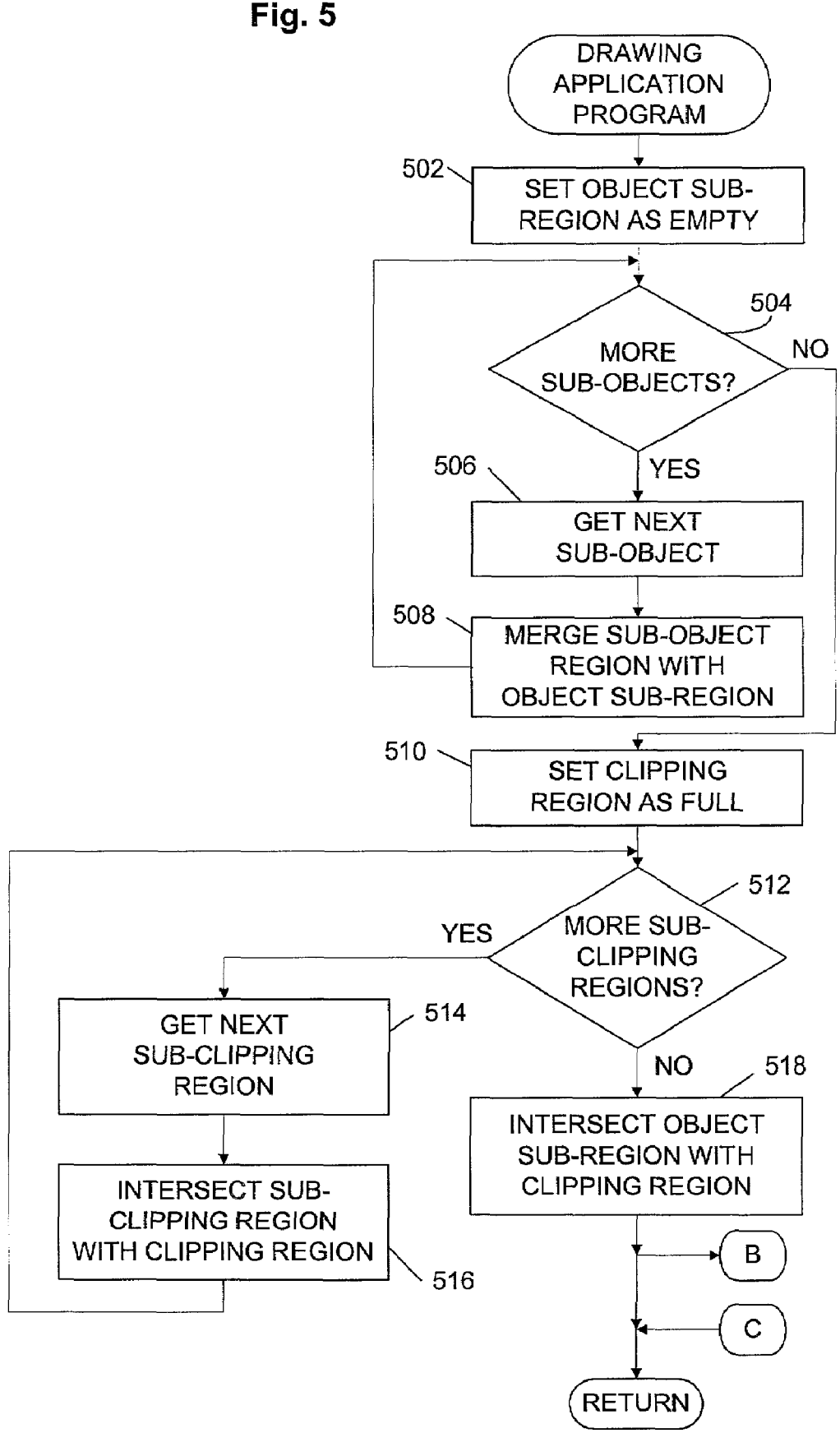
FIG. 5 depicts a flow diagram illustrating the steps for determining an object sub-region in accordance with methods and systems consistent with the present invention.

FIG. 5 depicts step 404 of FIG. 4 in more detail. Referring to FIG. 5, first the drawing program sets the object sub-region as empty (step 502). In other words, the drawing program sets the object sub-region as having an area of zero pixels.

Figure 6:
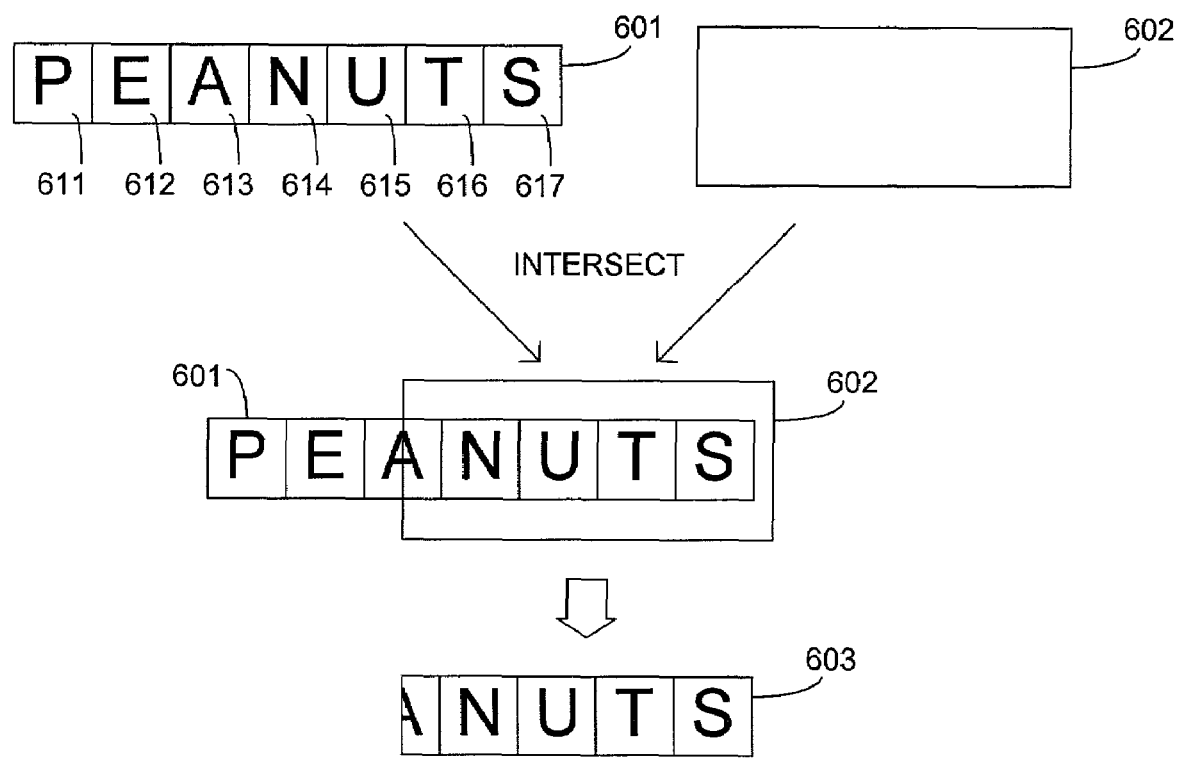
FIG. 6 depicts a block diagram of an illustrative example of determining an object sub-region in accordance with the steps of FIG. 5.

The drawing program then determines if there is a sub-object to add to the object sub-region (step 504). If the drawing program determines in step 504 that there is a sub-object to add, then the drawing program obtains the sub-object (step 506). For example, referring to an illustrative example depicted in FIG. 6, the sample object comprises the string of characters forming the word "PEANUTS". The object sub-region that contains the object to be drawn in this example is depicted by rectangle 601, including the entire character string. The object sub-region 601 includes a plurality of sub-objects formed by the individual letters of the character string "PEANUTS", denoted by reference numerals 611, 612, 613, 614, 615, 616 and 617. In step 506, the drawing program obtains the sub-object letter "P" to add to the object sub-region.

Referring back to FIG. 5, once the sub-object is obtained, the drawing program merges the region of the sub-object with the object sub-region (step 508). Accordingly, the object sub-region now defines an area that comprises the region of the sub-object. Referring to the example in FIG. 6, the region of the sub-object "P" 611 is merged with the object sub-region define the object sub-region 601 as an area containing the sub-object "P" 611.

Referring back to FIG. 5, the drawing program then returns to step 504 to determine whether there is another sub-object. If there is another sub-objects, then the sub-object is obtained in step 506, as described above, and the region of the sub-object is merged with the object sub-region in step 508, as described above. In the illustrative example of FIG. 6, the drawing program determines that there is another sub-object "E" 612, and obtains the sub-object 612 and merges the region of the sub-object with the object sub-region 601. Accordingly, the object sub-region 601 will contain sub-object "P" 611 and sub-object "E" 612.

Steps 504 through 508 continue until the object sub-region 601 contains all of the sub-objects 611-617, that is until the object sub-region contains the text string "PEANUTS".

In FIG. 5, if the drawing program determines in step 504 that there are no more sub-objects, then the drawing program sets a clipping region to the size of the display screen (step 510). The clipping region defines a window, such as an X Window, on the display screen. Items within the window are viewable to a user, while items that are outside of the extents of the window are not viewable. Therefore, if the entire object sub-region lies within a window, then the entire sub-region will be displayed. Otherwise, some or all of the object sub-region will not be displayed, and the portion of that will not be displayed is clipped from the object sub-region by the drawing program. Windows are known to one having skill in the art and are not described in more detail herein.

For example, a browser program for browsing information on computer networks such as the worldwide web or the Internet, can provide on a video display screen a concatenation of individual frames displaying information from individual sources. For example, a first frame on such a screen could display information of a retrieved text document, while a second frame on the screen could present a scroll bar, a table of contents, or an advertisement. As the individual frames on the screen have a limited size, it is possible that the drawing program cannot display the entire object within the respective window, such that a portion of the object is to be drawn and consequently a portion of the background image information needs to obtained.

Further, the drawing program can determine the extents of the clipping region based on an input received from a user. For example, the drawing program can receive a user input, via for example keyboard input, that specifies the size of a window for displaying an object. Alternatively, the received user input can be based on the user moving part of the window out of the screen, such that part of the window disappears, e.g., through scrolling operations or drag and drop operations.

Also, the clipping region can be based on the video display screen's characteristics, i.e., the size of windows on the screen or on the overall size of the screen. For example, if the screen has small dimensions, such as in the case of a mobile device such as a mobile telephone, the drawing program may be required to clip a large part of the object for display.

The drawing program then determines whether there is a sub-clipping region, such as an open window, displayed on the screen (step 512). If the drawing program determines that there is a sub-clipping region in step 512, then the drawing program obtains the coordinates of the sub-clipping region (step 514). Referring to the example in FIG. 6, the drawing program determines that there is a sub-clipping region 602. This sample sub-clipping region 602 can be, for example, an X Window open on video display screen.

Referring back to FIG. 5, the drawing program then intersects the subclipping region with the clipping region (step 516). This accordingly sets the clipping region to the size and location of the sub-clipping region. Then, the flow returns to step 512, where the drawing program determines whether there are any more sub-clipping regions. If the drawing computer program determines that there are more sub-clipping regions, then steps 514-516 are repeated.

If the drawing computer program determines in step 512 that there are no more sub-clipping regions, then the drawing computer program intersects the object sub-region with the clipping region (step 518). This comprises clipping any portion of the object sub-region that falls outside of the coordinates defining the clipping region. In other words, the boundaries of the object sub-region are reduced to exclude portions that fall outside the clipping region. As shown in the illustrative example of FIG. 6, the letters "P", "E", and part of the letter "A" of the object sub-region 601 fall outside of the clipping region 602. Accordingly, the drawing computer program clips that non-viewable portion of the object sub-region to provide a smaller object sub-region 603.

Referring back to FIG. 4, once the object sub-region is determined, the drawing program then determines the information for the background image on which the object image will be displayed (step 406).

Figure 7A:
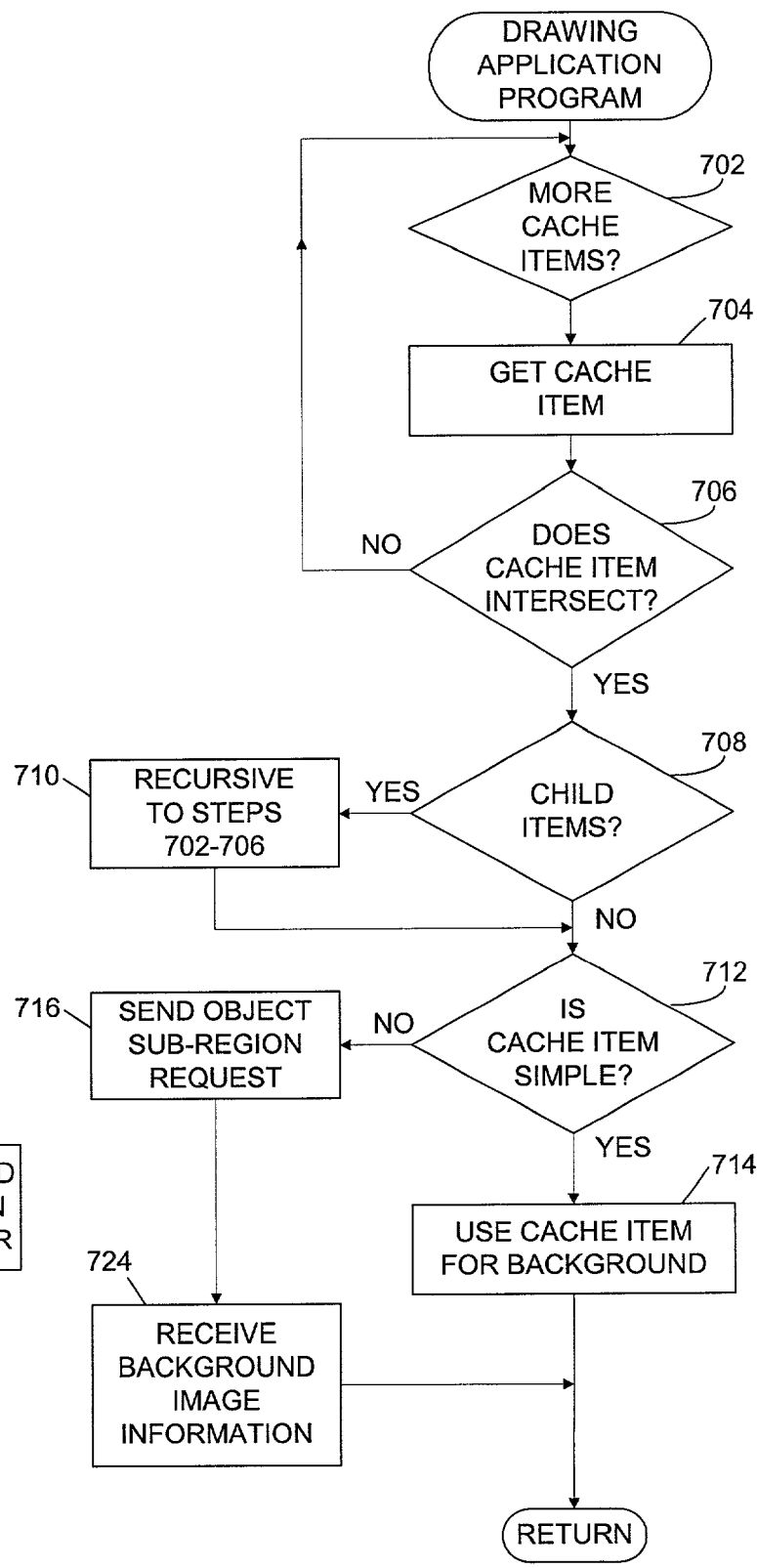
FIG. 7a depicts a flow diagram illustrating the steps performed by the drawing program for obtaining background image information in accordance with methods and systems consistent with the present invention.

FIG. 7a depicts step 406 of FIG. 4 in more detail. As described above with reference to FIG. 1, the drawing program maintains a representation of the background image locally in a data structure 130 in memory 106. The data structure is a collection of data items describing image altering operations already applied to the background image. For example, when a new object such as a new text string is displayed over the background image, the drawing program updates the data structure to include a data item describing the new object. The data structure can be implemented, for example, as a tree structure with the original plain background as the root and with added objects as branches.

Figure 8:
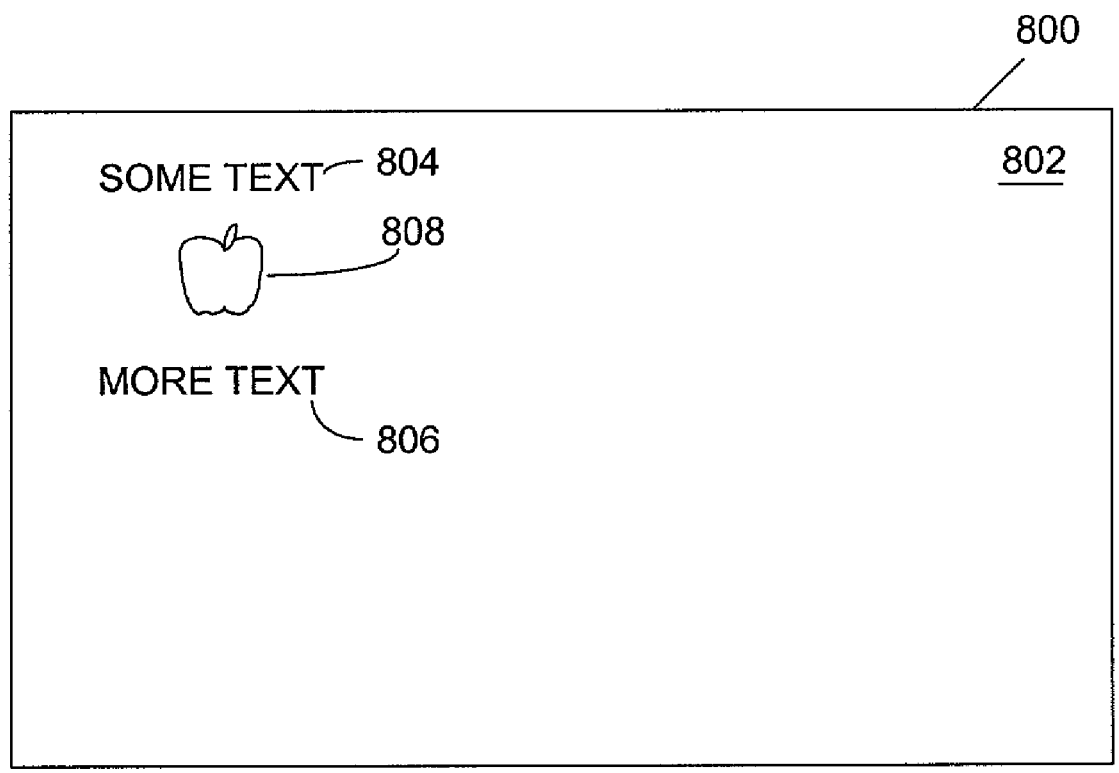
FIG. 8 depicts a block diagram of an illustrative example of a background image suitable for use with methods and systems consistent with the present invention.

FIG. 8 depicts a block diagram of an illustrative background image 800 on a display device. As illustrated, the background image contains an original background field 802 of an empty yellow field. A first text field with the characters "SOME TEXT" 804 appears between coordinates (x=10, y=5) and (x=110, y=25). A second text field with the characters "MORE TEXT" 806 appears between coordinates (x=10, y=50) and (x=110, y=80). An unscaled image data of an apple image 808 appears between coordinates (x=10, y=30) and (x=50, y=50).

The data structure representing this background image can be a tree structure with the following representation:
(document root: empty yellow page)
+text inbetween coordinates (x=10, y=5) and (x=110, y=25)
+text inbetween coordinates (x=10, y=50) and (x=110, y=80)
+unscaled image data from file "A.gif" inbetween coordinates (x=10, y=30) and (x=50, y=50).

In the illustrative data structure, each item is added to the tree structure by the drawing program, for example, when that item is sent to the display program for display. Alternatively, the data structure can have a form other than a tree structure, such as an array.

Figure 2:
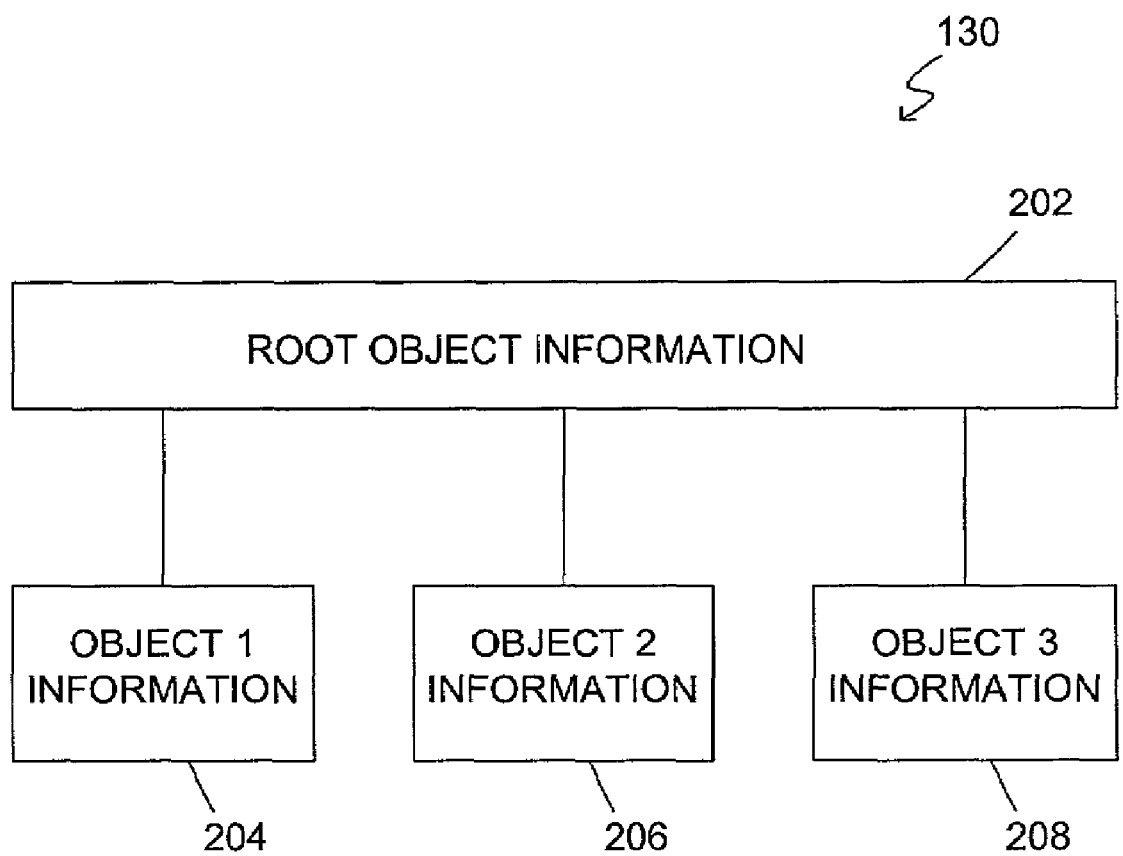
FIG. 2 depicts a block diagram of a data structure suitable for use with methods and systems consistent with the present invention.

Referring back to FIG. 7a, for determining the background image information, first the drawing program determines whether there is a background image item in the local cache, that is stored locally in the data structure (step 702). The drawing program makes this determination by traversing the tree structure of the data structure, beginning with the root. As described above, an illustrative example of a tree structure is depicted in FIG. 2. If the drawing program determines that there is an item in the cache in step 702, then the drawing program retrieves the information describing that item from the cache (step 704). Referring to the example depicted in FIG. 8, the drawing program retrieves information regarding empty yellow page 802. The information can comprise the color, size, and coordinates of the empty yellow page and may contain additional information.

Then, the drawing program determines whether the retrieved cache item intersects with the object sub-region (step 706). The cache item intersects with the object sub-region when the cache item and the object sub-region have overlapping coordinates. For example, in the example shown in FIG. 8, the empty yellow page fills the entire field of the display screen, so the empty yellow page intersects the object sub-region.

Referring back to FIG. 7a, if the drawing program determines in step 706 that the cache item does not intersect the object sub-region, then flow returns to step 702 to determine if there is another cache item. If the drawing program determines that the cache item intersects the object sub-region in step 706, then the drawing program determines whether there is a child item within the cache item (step 708). In the illustrative example of FIG. 8, the drawing program would determine that the first text object 804 is a leaf node (i.e., a child node) of the empty yellow page 802, which is the root. When there is a child item as determined in step 708, then the flow recursively flows back to steps 702-706, as indicated by step 710.

Once recursive step 710 has completed or if the drawing program determines that there are no child cache items in step 708, then the drawing program determines whether the cache item is a "simple" cache item, meaning that it is stored in the local cache since it requires a small amount of memory. For example, the empty yellow page of FIG. 8 can be described by a rectangle having a color and specific coordinates. This object is simple enough that it can be stored by the drawing program in the local cache. Thus, items that comprise a single, solid color can be considered simple items. Alternative, the drawing program can use heuristics to determine whether an item is simple enough to store in the local cache. The use of heuristics in this manner is known to one having skill in the art and will not be described in more detail. A complex cache item, on the other hand, requires more memory and thus is stored in the frame buffer. In the example of FIG. 8, for example, the first text object 804, the second text object 806, and the unscaled image data 808 are complex objects that are stored in the frame buffer.

If the drawing program determines in step 712 that the cache item is a simple cache item, then the drawing program uses the information relating to the background image that is stored in the local cache (step 714).

On the other hand, if the drawing program determines that the cache item is not a simple cache item in step 712, then the drawing program sends an object sub-region request to the display program to retrieve the information relating to the complex cache item (step 716). Transmittal of the object sub-region request is illustratively depicted in FIGS. 1 and 3 by arrow 151. For example, in the example shown in FIG. 8, if the object sub-region overlaps the first text object 804, which is a complex cache item, then the drawing program sends an object sub-region request to the display program to get information regarding the first text object 804. The object sub-region request can be, for example, a call sent to the display program. Calls are known to one having skill in the art and will be only generally described. The call is a request that uses a communication protocol and contains a data structure which identifies the pixels of the portion of the background image that correspond to the object sub-region. The data structure in the call can, for example, define the boundary coordinates of the portion of the background image.

As will be described in more detail below, in response to receiving the call, the display program retrieves information about the identified pixels from the frame buffer using a call, and returns the pixel information to the drawing program.

Figure 7B:
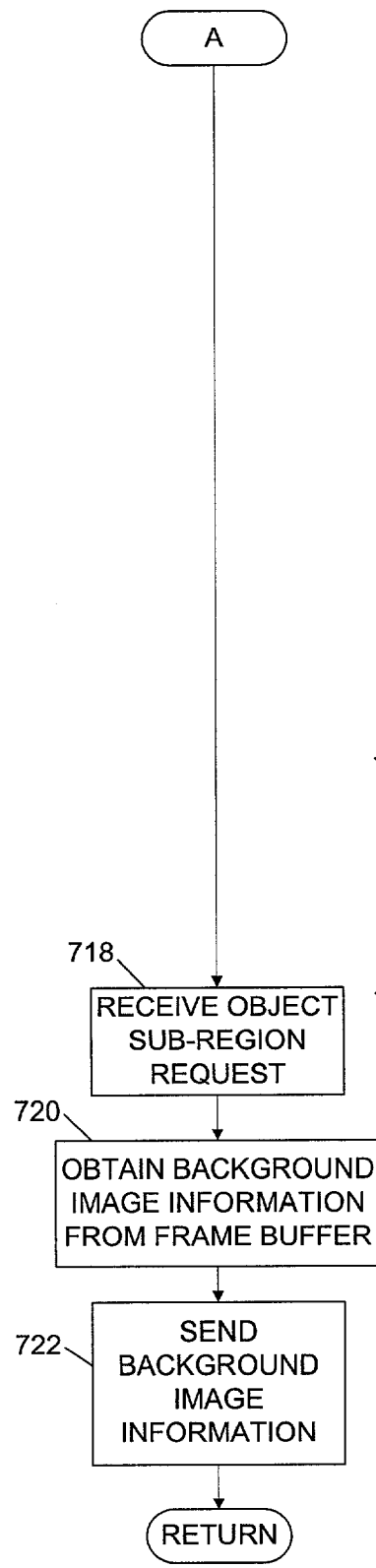
FIG. 7b depicts a flow diagram illustrating the steps performed by the display program for obtaining background image information in accordance with methods and systems consistent with the present invention.

The display program determines whether it has received the object sub-region request, as depicted by step 413 in FIG. 4. If the display program determines that it has received an object sub-region request from the drawing program then it executes step 414 of FIG. 4, which is shown in more detail by steps 718, 720, and 722 in FIG. 7b. As illustrated in FIG. 7b, the display program receives the object sub-region request sent by the drawing program (step 718).

The display program then obtains the pixel information corresponding to the coordinates identified in the object sub-region request from the frame buffer (step 720). The display program obtains the pixel information using, for example, a call that identifies the pixels of the portion of the background image that correspond to the object sub-region.

Then, the display program sends the background image information corresponding to the object sub-region to the drawing program (step 722). The transmittal of the background image information from the display program to the drawing program is illustratively depicted in FIGS. 1 and 3 by arrow 152.

Referring back to FIG. 7a, the drawing program then receives the background image information sent by the display program (step 724).

Having obtained the background image information corresponding to the object sub-region, the flow returns back to FIG. 4, where the drawing program merges the object image information with the background image information (step 408). Merging refers to combining the object image information with the background image information using raster operations, such as antialiasing. Antialiasing operations merge pixel values depending on transparency information contained in the object's pixels in order to enhance the appearance of the object's boundaries. For example, a raster overlay operation merges a foreground object pixel with a color A and a background image pixel with a color B using a transparency information T, in order to produce a resulting pixel with a color C. An illustrative formula for performing this operation is as follows:

$$C=A-T*(B-A).$$

Also, as is known to one having skill in the art, there are other raster operations, such as a reverse overlay operation, which can have the following formula:

$$C=B-T*(A-B).$$

Raster operations, including antialiasing, are known to one having skill in the art, and therefore will be described in a general nature herein.

The drawing program identifies pixels of the background image that intersect with the object boundaries, in order to improve the appearance of the object at locations where the object boundaries are superimposed on a background image. Further, if the object is specified to be transparent at the object boundary, then the drawing program may analyze pixels located at an interior of the object including object information and background information. Therefore, if a transparent object is to be displayed onto a background image on the client video display, all pixels at least partially covered by the object may be analyzed.

Figure 9:
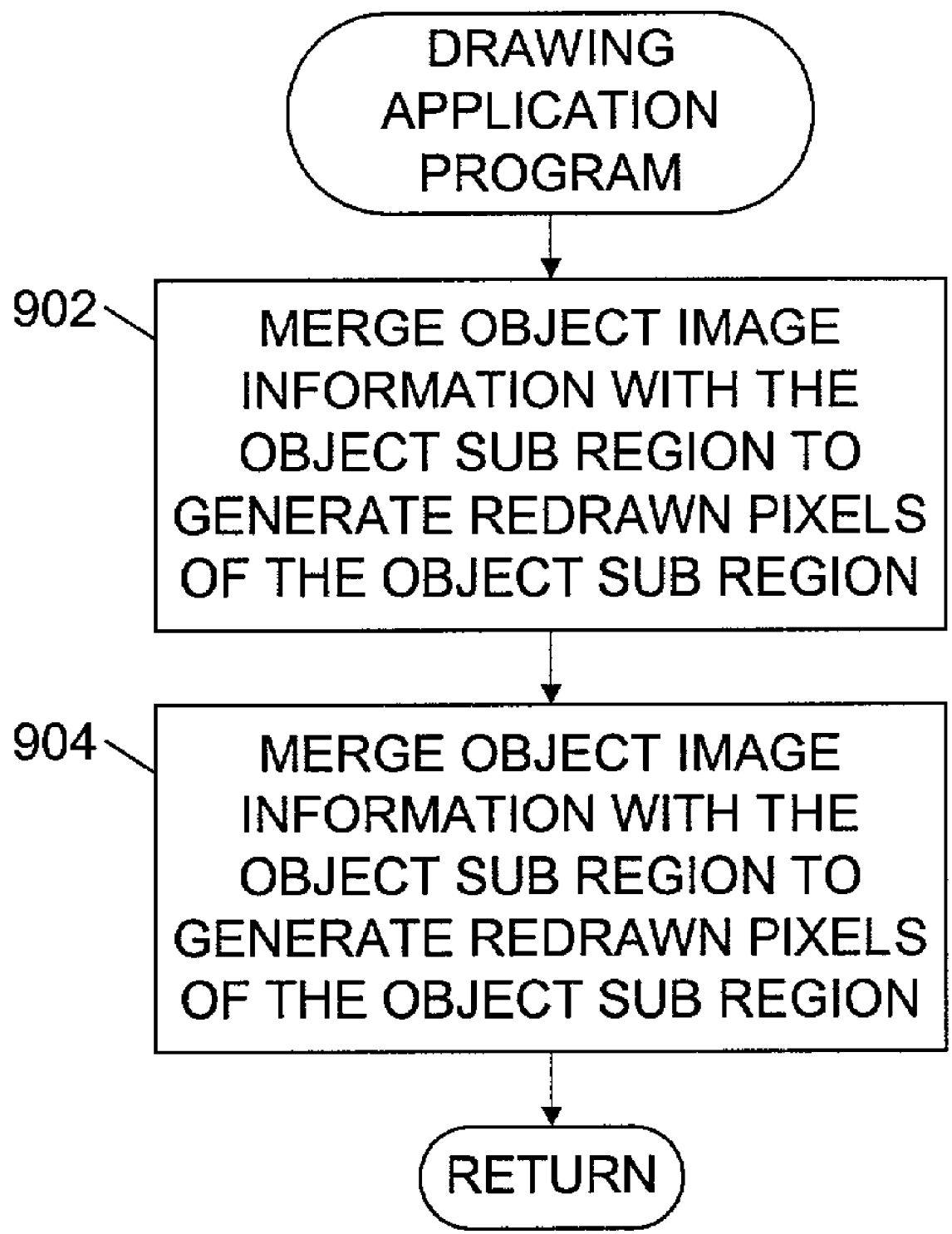
FIG. 9 depicts a flow diagram illustrating the steps for merging an object image with a background image in accordance with methods and systems consistent with the present invention.

Referring to FIG. 9, in FIG. 9 a more detailed description of step 408 of FIG. 4 is presented. As illustrated in FIG. 9, first, the drawing program merges the object image information with the background image information for the portion of the background image that corresponds to the object sub-region (step 902). The merging of the object image information with the background image information provides redrawn pixels of the object sub-region. As described above, the object image information comprises, for example, a color or saturation of the each pixels of the object. The object sub-region includes the background image information retrieved from the local cache or from the frame buffer. This step comprises the drawing program performing a raster operation, such as the raster overlay operation described above. As described above, pixels of the object that intersect with pixels of the background image are analyzed for, for example, color, and the pixels are assigned a color such that the object will be displayed with smooth boundaries.

The drawing program perform the merging operation for all pixels within the object sub-region that are intersected by the object boundary, or more generally stated, for all pixels which are not entirely covered by the object. In other words, for all pixels where the object boundary intersects the respective pixel or where the object covers the pixel but the object is specified to be translucent.

Then, the drawing program performs the merging operation for remaining pixels intersected by the object boundary or otherwise covered by the object, using any cached redraw requests (step 1103). As will be described in more detail below with reference to FIG. 11, a redraw request is a request received by the drawing program to redraw a certain area of the video display screen, where the area is 'overwritten' by newer information, such as an updated display window or a new page to be displayed. A redraw request may concern the entire screen or may relate to a fraction of the screen, and may instruct the drawing program to overwrite a certain portion of the screen with information included in the redraw request. The drawing program receives redraw requests from, for example, other programs.

In this case, the object information and the background image information, which is the information contained in the cached redraw request, is known by the drawing program, so a merging operation that is similar to the one described above with respect to step 902 of FIG. 9 may be performed.

After performing the merging operations for redrawing the pixels of the object sub-region, the redrawn pixels constitute new background image information and, thus, the drawing server program updates the data structure with the new background image information. For example, referring to the data structure described above with respect to FIG. 8, after the drawing program merges an object with the background image, the drawing program adds an entry to the data structure for the new object.

Figure 10:
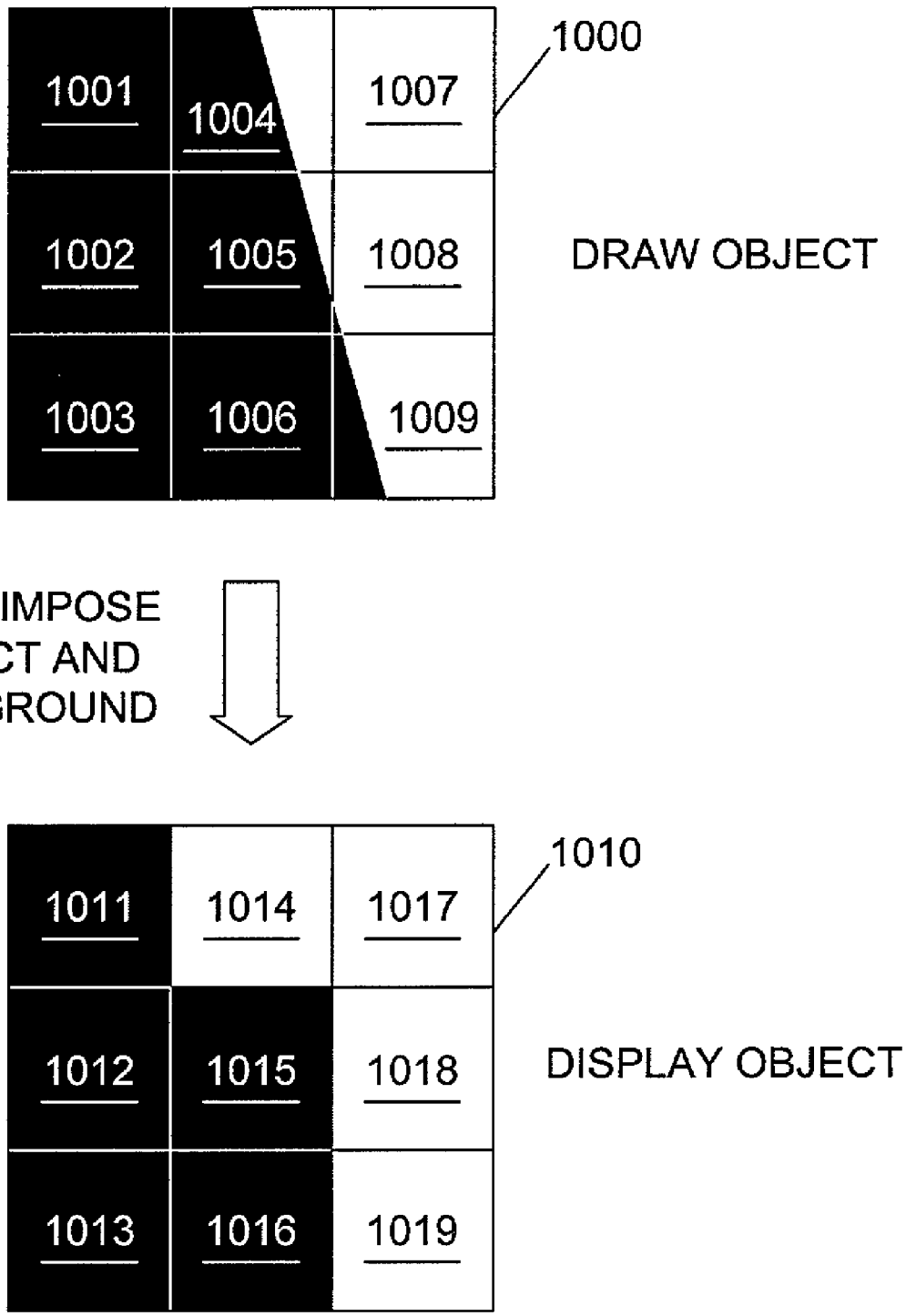
FIG. 10 depicts a block diagram of an illustrative example of merging an object image with a background image in accordance with the steps of FIG. 9.

Referring to FIG. 10 as an illustrative example relating to the steps described in FIG. 9, in the upper part of FIG. 10, an object sub-region 1000 of an object to be drawn is illustrated, where object sub-region 1000 contains a part of an object drawn with black ink. For example, the object could be a part of the letter "A" obliquely cutting through object sub-region 1000 on the screen. Object sub-region 1000 is partitioned into fields or pixels 1001-1009, representing the pixels on the screen.

While pixels 1001, 1002, 1003, and 1006 are assumed to be fully covered by the object to be drawn, pixels 1004, 1005, 1008 and 1009 are partially covered by the object, i.e., the boundary of the object intersects the respective pixels. Pixel 1007 is assumed to be not covered by the object to be drawn.

As object sub-region 1000 shows a case which can not actually be displayed, because a pixel may either be colored black or white, when merging the object information with the background image information, the drawing program executes an antialiasing operation to redraw pixels intersected by the object boundary to be solidly colored.

In the merging operation, the drawing program redraws the pixels intersected by the object boundary to reflect both background image information and object information. This can be achieved, for example, by computing a mean gray level based on the amount of coverage of a respective pixel by the object and could lead to the gray level distribution of the area denoted 1010, or by another operation, such as a smoothing operation.

While pixels 1011, 1012, and 1013 that are fully covered by the object and will be colored black, and pixel 1017 not covered by the object and will remain containing the background information, that is white, the partially covered pixels 1014, 1015, 1018, and 1019 will be recomputed by the drawing program based on the background information and the object information as described above. This could, for example, lead to the particular gray levels of pixels 1014, 1015, 1018, and 1019 depending on the amount of coverage of the individual pixels by the object.

The gray level distribution of the pixels of region 1010 actually displayed on the screen will lead to an improved appearance of the object to be drawn, particularly if viewed from some distance, as the transition between black and white will more naturally follow the object boundary.

Referring back to FIG. 4, once the drawing program has generated the redrawn object sub-region in step 408, the drawing program outputs the redrawn object sub-region to the display program (step 410). This can be done using, for example, a put to the display program. Puts are known to one having skill in the art will be only generally described. The put uses a communication protocol and contains a data structure that identifies the position of the redrawn object sub-region and redrawn object sub-region image information. As will be described below, in response to receiving the put, the display program stores the redrawn object sub-region image information in the frame buffer to display the redrawn object sub-region on the video display.

The object sub-region that is sent by the drawing program contains an image that comprises at least the modified pixels of the object sub-region (step 412).

The display program then receives the redrawn object sub-region from the drawing program (step 416). Accordingly, the display program then stores the received pixels of the redrawn object sub-region as new background image information in the frame buffer (step 418). This storage of the redrawn object sub-region in the frame buffer outputs the redrawn object sub-region image to the video display.

Thus, the above described steps allow a drawing program to decide whether to merge object image information with locally stored background image information or with background image information stored in the frame buffer. This provides an improvement over typical drawing programs, which do not merge the object image information with locally stored background information.

Further, when the drawing program requests background image information from the display program, since the drawing program does not request the entire background image information, but instead requests a region including the object, a bandwidth requirement for displaying the object can be reduced significantly, thus improving performance of the drawing operations, particularly when the communication link between the drawing program and the display program has a limited bandwidth.

Figure 11:
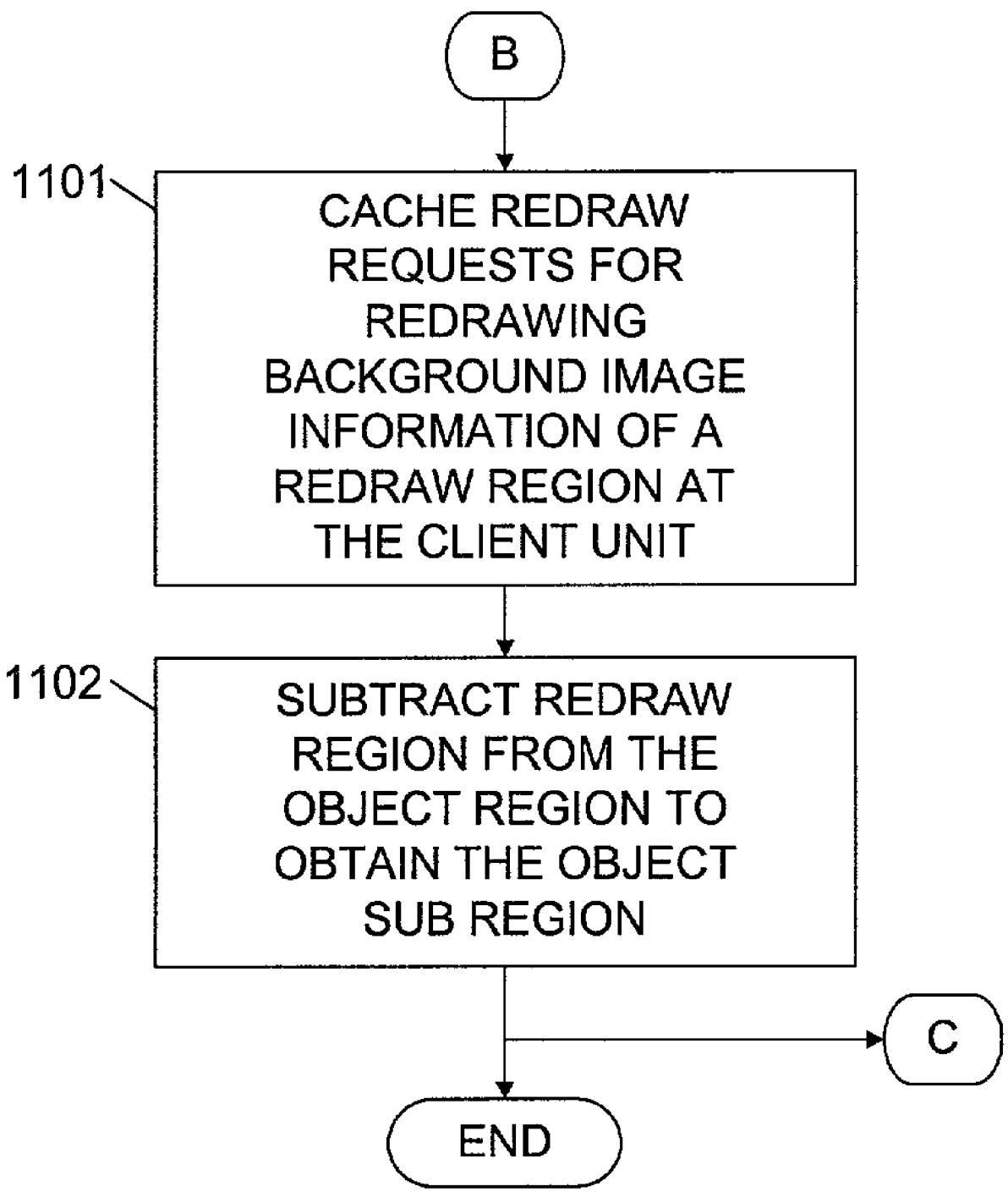
FIG. 11 depicts a flow diagram illustrating the steps for using a redraw cache for redrawing a background image in accordance with methods and systems consistent with the present invention.

FIG. 11 depicts a flow diagram illustrating exemplary steps carried out at the client computer system for further reducing the size of the object sub-region using cached redraw requests. The steps depicted in FIG. 11 can be implemented as an option. The flow of steps in FIG. 11 starts at entry point B, corresponding to exit point B of FIG. 5.

Referring to FIG. 9, first, the drawing program caches redraw requests for redrawing background image information of a redraw region (step 1101). The drawing program caches the redraw requests, for example, in the memory. Redraw requests can be either generated by the drawing program or received by the drawing program from another program. A redraw request effects that a certain area of the video display screen is 'overwritten' by newer information, such as an updated display window or a new page to be displayed. A redraw request may concern the entire screen or may relate to a fraction of the screen, and may instruct the drawing program to overwrite a certain portion of the screen with information included or associated with the redraw request.

For example, the redraw request could include information instructing the drawing program to redraw a region of the screen in a particular color, for example with a changed background color, and where information contained in character strings is to be displayed for text editing. Accordingly, the redraw request may specify a redraw region of the screen and specify a particular color to be displayed within the specified region.

The drawing program caches the redraw request, for example, by storing the redraw request into a temporary memory location, such as a buffer.

The drawing program may maintain an updated version of the cached redraw request, by discarding an old redraw request, if a more recent redraw request for the same region of the screen is received. If a sub-region of a region specified by a redraw request is covered by a newer redraw request, then the drawing program can discard parts of a redraw request. The drawing program can accomplish this by rewriting an already cached redraw request to specify a particular portion of the original redraw region of the already cached redraw request that is not covered by the more recent redraw request.

Redraw requests may specify regions on the screen as rectangles, e.g., by specifying the coordinates of the rectangle, or may specify other shapes on the screen.

The redraw request specifies at least the redraw region of the screen, such as by coordinates, and a rule for filling the redraw region, as described above with reference to the locally cached background image information. Thus, caching the redraw request as outlined above does not require large amounts of storage space.

Alternatively, redraw requests can contain bitmaps of a background image to be displayed within a redraw region.

Furthermore, if redraw requests specify small screen redraw regions, the drawing program can intermediately cache such redraw requests, even if they contain image information such as bitmap information.

Figure 12:
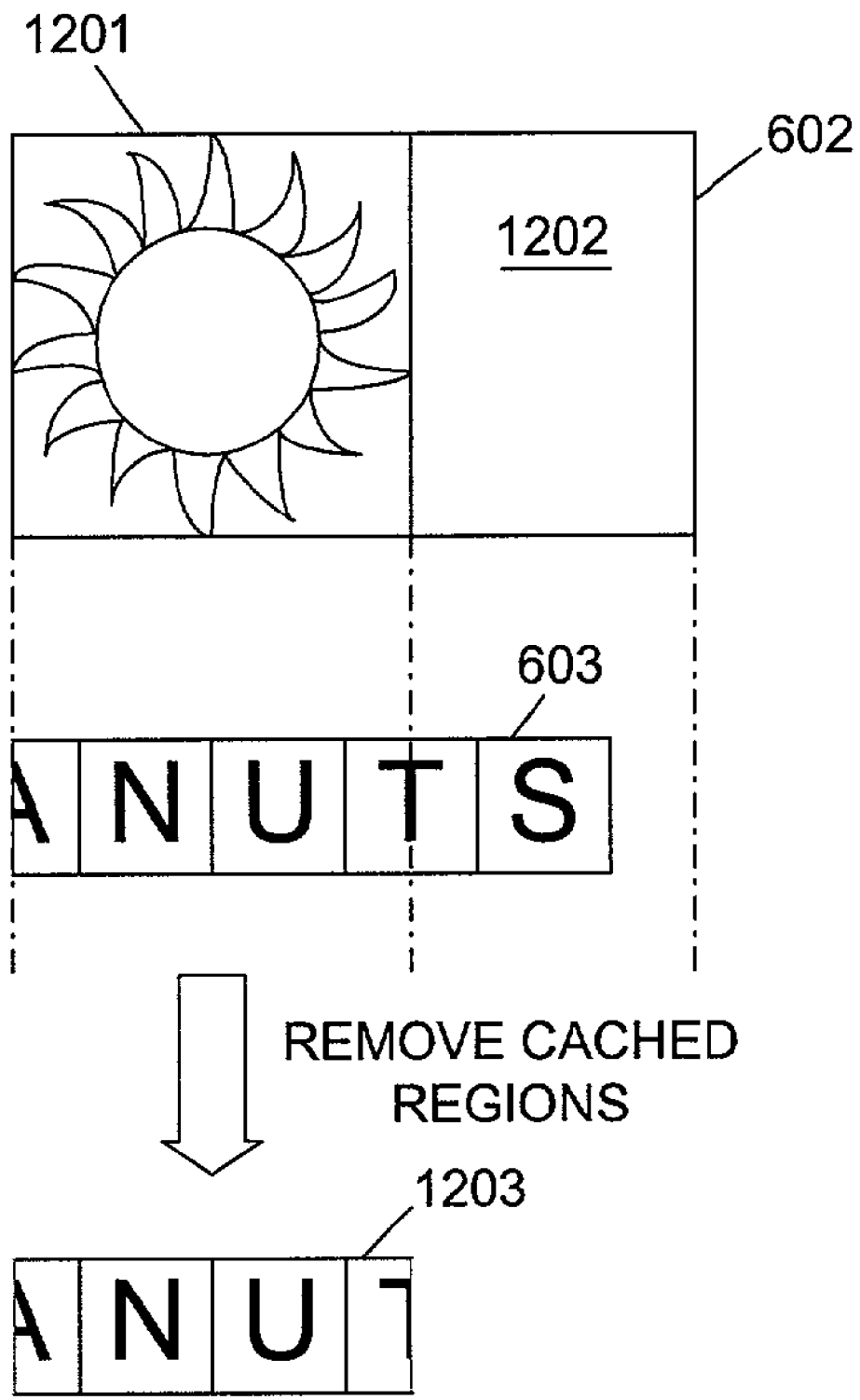
FIG. 12 depicts a block diagram of an illustrative example for using a redraw cache for redrawing a background image in accordance with the steps of FIG. 11.

Referring to FIG. 12 as an example, FIG. 12 illustratively shows the clipping region 602, which is described above with reference to FIG. 6. The clipping region 602 includes an image region 1201 displaying, e.g., a bitmap of an image to be displayed. Further, the clipping region 602 includes a redraw region 1202, which is specified by a cached redraw request. The redraw region 1202 is assumed to be colored in white, i.e., the redraw request specifies an interior of the redraw region 1202 to contain white color.

Accordingly, the information displayed within the redraw region 1202 is known by drawing program, while the region 1201 containing the image information is not assumed to be known by the drawing program, e.g., because caching a redraw request including bitmap information would require an excessive amount of storage space and thus is avoided.

Referring back to FIG. 11, once the redraw request is cached, the drawing program subtracts the redraw region from the object region to obtain the object sub-region (step 1102). Thus, the size of the object sub-region may be further reduced by the individual redraw regions covering at least part of the object region. As for the parts of the object region covered by the redraw region, the information contained within the redraw regions is already known by the drawing program and does not need to be retrieved from the display program a second time. The drawing program may subtract the redraw region from the object region by comparing the coordinates of the respective regions and by identifying coordinates of a region on the screen covered by the object region but not by the redraw region.

Referring back to the example in FIG. 12, underneath the clipping region 602, the clipped object region 603, which was described above with respect to FIG. 6, is illustrated.

As further illustrated in FIG. 12, the cached redraw region 1202 is subsequently subtracted from the clipped object region 603 by the drawing program, thus arriving at a further reduced object sub-region 1203 including a still smaller sub-fraction of the original character string "PEANUTS". The drawing program can perform the removal by re-specifying the coordinates defining the object sub-region to not include a region that is covered by a redraw region, such as redraw region 1202.

Consequently, the object region 1203 covers that part of the original object region that fits into the clipping region, and the background of which is not already known by the drawing program due to a cached redraw request. Accordingly, the drawing program retrieves the background image information within the object sub-region 1203 from the display program, thus further reducing communication requirements between the drawing program and the display program. After step 1102 of FIG. 11, the flow may continue to entry point C in FIG. 5.

One of skill in the art will appreciate that while in the above flow diagrams steps are shown in a specific sequence, it is noted that this sequence of steps may be varied.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method performed by a program in a data processing system for outputting an object having object image information to a display device that includes a plurality of pixels with background image information, the method comprising the steps performed by the program of:

determining a sub-region of the object including at least one pixel intersected by a boundary of the object, the sub-region corresponding to a portion of the background image information;

determining whether the portion of the background image information corresponding to the sub-region is stored locally with respect to the program or remotely with respect to the program; and when it is determined that the portion of the background image information is stored locally, retrieving the portion of the background image information locally to facilitate generating a redrawn sub-region of the object.

2. The method of claim 1, further comprising the step of: generating a redrawn sub-region of the object for output by merging the object image information with the retrieved portion of the background image information.

3. The method of claim 2, wherein the step of generating a redrawn sub-region of the object for output by merging the object image information with the retrieved portion of the background image information comprises:

drawing the object; and calculating at least one pixel parameter reflecting the object image information and the background image information of the at least one pixel.

4. The method of claim 1, further comprising the step of: displaying the redrawn sub-region of the object on the display device.

5. The method of claim 1, further comprising the step of: when it is determined that the portion of the background image information is stored remotely, retrieving the portion of the background image information remotely to facilitate generating a redrawn sub-region of the object.

6. The method of claim 5, further comprising the step of: generating a redrawn sub-region of the object for output by merging the object image information with the retrieved portion of the background image information.

7. The method of claim 5, further comprising the step of: displaying the redrawn sub-region of the object on the display device.

8. The method of claim 1, further comprising the steps of: determining an object region including pixels at least partially covered by the object; and determining a clipping region for the object, wherein the sub-region of the object is determined as an area shared by the clipping region and the object region.

9. The method of claim 8, wherein the clipping region is based on a characteristic of the display device.

10. The method of claim 8, wherein the clipping region is based on a user input.

11. The method of claim 1, wherein the sub-region of the object is a rectangle including pixels intersected by the boundary of the object.

12. The method of claim 1, wherein the object comprises a plurality of sub-objects.

13. The method of claim 1, wherein the object comprises a letter.

14. The method of claim 1, wherein the object comprises a number.

15. The method of claim 1, wherein the object comprises a character.

16. The method of claim 1, wherein the object comprises a geometrical shape.

17. The method of claim 1, further comprising the steps of: obtaining a redraw request for redrawing a portion of the background image information corresponding to a display region;

storing the obtained redraw request; and deleting the stored redraw request when a more recent redraw request for the display region is obtained.

18. The method of claim 17, wherein the sub-region of the object is determined by subtracting the display region of the redraw request from an object region.

19. The method of claim 17, further comprising the step of: generating a redrawn sub-region of the object for output by merging the object image information with the background image information of any remaining pixels intersected by the boundary of the object using the stored redraw request.

20. The method of claim 1, further comprising the steps of: generating a sub-region of the object request for obtaining from a display program the portion of the background image information corresponding to the sub-region of the object;

transmitting the sub-region of the object request to the display program;

receiving the requested portion of the background image information corresponding to the sub-region of the object from the display program.

21. A method performed by a program in a data processing system for outputting an object having object image information to a display device that includes a plurality of pixels with background image information, the method comprising the steps performed by the program of:

determining a sub-region of the object including at least one pixel intersected by a boundary of the object;

determining whether a portion of the background image information corresponding to the sub-region of the object is stored locally with respect to the program in a cache or remotely with respect to the program in a frame buffer;

when it is determined that the portion of the background image information is stored locally, retrieving the portion of the background image information corresponding to the sub-region of the object from the cache;

when it is determined that the portion of the background information is stored remotely, retrieving the portion of the background image information corresponding to the sub-region of the object from the frame buffer by transmitting a sub-region of the object request from the program to a display program for requesting the portion of the background image information corresponding to the sub-region of the object from the frame buffer, and receiving from the display program the requested portion of the background image information; and generating a redrawn sub-region of the object for output by merging the object image information with the retrieved portion of the background image information.

22. A computer-readable medium containing instructions that cause a program in a data processing system to perform a method, the data processing system for outputting an object having object image information to a display device that includes a plurality of pixels with background image information, the method comprising the steps performed by the program of:

determining a sub-region of the object including at least one pixel intersected by a boundary of the object, the sub-region corresponding to a portion of the background image information;

determining whether the portion of the background image information corresponding to the sub-region is stored locally with respect to the program or remotely with respect to the program; and when it is determined that the portion of the background image information is stored locally, retrieving the portion of the background image information locally to facilitate generating a redrawn sub-region of the object.

23. The computer-readable medium of claim 22, further comprising the step of:
generating a redrawn sub-region of the object for output by merging the object image information with the retrieved portion of the background image information.

24. The computer-readable medium of claim 23, wherein the step of generating a redrawn sub-region of the object for output by merging the object image information with the retrieved portion of the background image information comprises:
drawing the object; and
calculating at least one pixel parameter reflecting the object image information and the background image information of the at least one pixel.

25. The computer-readable medium of claim 22, further comprising the step of:
displaying the redrawn sub-region of the object on the display device.

26. The computer-readable medium of claim 22, further comprising the step of:
when it is determined that the portion of the background image information is stored remotely, retrieving the portion of the background image information remotely to facilitate generating a redrawn sub-region of the object.

27. The computer-readable medium of claim 26, further comprising the step of:
generating a redrawn sub-region of the object for output by merging the object image information with the retrieved portion of the background image information.

28. The computer-readable medium of claim 26, further comprising the step of:
displaying the redrawn sub-region of the object on the display device.

29. The computer-readable medium of claim 22, further comprising the steps of:
determining an object region including pixels at least partially covered by the object; and
determining a clipping region for the object, wherein the sub-region of the object is determined as an area shared by the clipping region and the object region.

30. The computer-readable medium of claim 29, wherein the clipping region is based on a characteristic of the display device.

31. The computer-readable medium of claim 29, wherein the clipping region is based on a user input.

32. The computer-readable medium of claim 22, wherein the sub-region of the object is a rectangle including pixels intersected by the boundary of the object.

33. The computer-readable medium of claim 22, wherein the object comprises a plurality of sub-objects.

34. The computer-readable medium of claim 22, wherein the object comprises a letter.

35. The computer-readable medium of claim 22, wherein the object comprises a number.

36. The computer-readable medium of claim 22, wherein the object comprises a character.

37. The computer-readable medium of claim 22, wherein the object comprises a geometrical shape.

38. The computer-readable medium of claim 22, further comprising the steps of:
obtaining a redraw request for redrawing a portion of the background image information corresponding to a display region;
storing the obtained redraw request; and
deleting the stored redraw request when a more recent redraw request for the display region is obtained.

39. The computer-readable medium of claim 38, wherein the sub-region of the object is determined by subtracting the display region of the redraw request from an object region.

40. The computer-readable medium of claim 38, further comprising the step of:
generating a redrawn sub-region of the object for output by merging the object image information with the background image information of any remaining pixels intersected by the boundary of the object using the stored redraw request.

41. The computer-readable medium of claim 22, further comprising the steps of:
generating a sub-region of the object request for obtaining from a display program the portion of the background image information corresponding to the sub-region of the object;
transmitting the sub-region of the object request to the display program;
receiving the requested portion of the background image information corresponding to the sub-region of the object from the display program.

42. A computer-readable medium containing instructions that cause a program in a data processing system to perform a method, the data processing system for outputting an object having object image information to a display device that includes a plurality of pixels with background image information, the method comprising the steps performed by the program of:
determining a sub-region of the object including at least one pixel intersected by a boundary of the object;
determining whether a portion of the background image information corresponding to the sub-region of the object is stored locally with respect to the program in a cache or remotely with respect to the program in a frame buffer;
when it is determined that the portion of the background image information is stored locally, retrieving the portion of the background image information corresponding to the sub-region of the object from the cache;
when it is determined that the portion of the background information is stored remotely, retrieving the portion of the background image information corresponding to the sub-region of the object from the frame buffer by
transmitting a sub-region of the object request from the program to a display program for requesting the portion of the background image information corresponding to the sub-region of the object from the frame buffer, and
receiving from the display program the requested portion of the background image information; and
generating a redrawn sub-region of the object for output by merging the object image information with the retrieved portion of the background image information.

43. A data processing system comprising:
a display device having a plurality of pixels with background image information, the display device for displaying an object having object image information;
a memory comprising a computer program that determines a sub-region of the object including at least one pixel intersected by a boundary of the object, the sub-region corresponding to a portion of the background image information, determines whether the portion of the background image information corresponding to the sub-region is stored locally with respect to the computer program or remotely with respect to the computer program, and, when it is determined that the portion of the background image information is stored locally, retrieves the portion of the background image information locally to facilitate generating a redrawn sub-region of the object; and a processing unit that runs the computer program.

44. The data processing system of claim 43, wherein the display device comprises a frame buffer; and wherein, when the portion of the background image information is stored remotely, the background image information is stored in the frame buffer.

45. A data processing system for outputting an object having object image information to a display device that includes a plurality of pixels with background image information, the data processing system comprising:

means for determining a sub-region of the object including at least one pixel intersected by a boundary of the object, the sub-region corresponding to a portion of the background image information;

means for determining whether the portion of the background image information corresponding to the sub-region is stored locally with respect to the program or remotely with respect to the program; and means for retrieving the portion of the background image information locally to facilitate generating a redrawn sub-region of the object, when it is determined that the portion of the background image information is stored locally.

46. A computer-readable memory device encoded with a first program with a data structure that is stored locally with respect to the first program, the first program run by a processor in a data processing system, the data structure having a plurality of entries, each entry comprising:

a background image information for a portion of a background image displayed on a display device by a second program, wherein when the first program attempts to generate an object for display on the display device by the second program, the first program determines whether the object covers the portion of the background image stored in the data structure or covers a portion of the background information stored remotely with respect to the first program.

* * * * *